United States Patent [19]

Trainor et al.

[11] 3,877,361

[45] Apr. 15, 1975

[54] LIQUID SMOKE SPRAY CABINET

[75] Inventors: James E. Trainor; Thomas J. Haug, both of Manitowoc, Wis.

[73] Assignee: F. C. Heiden, Inc., Manitowoc, Wis.

[22] Filed: Apr. 2, 1973

[21] Appl. No.: 348,016

[52] U.S. Cl. .................... 99/478; 99/409; 99/481
[51] Int. Cl. .............................................. A23b 1/04
[58] Field of Search ................. 99/340, 408–409, 99/443 C, 446, 449, 473–474, 476–477, 478–479, 487, 516, 481; 126/59.5, 369, 377–378, 380; 137/432

[56] References Cited
UNITED STATES PATENTS

| | | | |
|---|---|---|---|
| 2,380,428 | 7/1945 | Gilliam | 99/487 X |
| 2,832,278 | 4/1958 | Taranik | 126/59.5 UX |
| 3,152,914 | 10/1964 | Taylor | 99/476 X |
| 3,199,436 | 8/1965 | Rasmussen et al. | 99/473 X |
| 3,288,054 | 11/1966 | Weprin et al. | 99/474 X |
| 3,447,685 | 6/1969 | Bircher | 99/408 X |
| 3,635,150 | 1/1972 | Piedally | 99/409 |
| 3,701,313 | 10/1972 | Boggs | 99/408 X |

Primary Examiner—Robert L. Bleutge
Assistant Examiner—Arthur O. Henderson

[57] ABSTRACT

The liquid smoke spray cabinet includes a treatment chamber and a carrier for supporting a rack carrying meat to be treated. The carrier is oscillated, preferably through a circular arc by a reversible motor and, as it is moved, liquid smoke is sprayed onto the outer surface of the meat through a plurality of vertically spaced spray nozzles carried on feeder conduits which are laterally spaced along the inside periphery of the treatment chamber. The bottom portion of the cabinet includes a basin which contains a supply of liquid smoke and in which excess liquid smoke dripping from the meat is collected for recycling. A plurality of vertically spaced filter screens are located above the basin to filter meat particles from the excess liquid smoke being collected. Make-up liquid smoke is introduced into the basin from a reservoir mounted on the outside of the cabinet to maintain a predetermined liquid level of the liquid smoke in the basin.

13 Claims, 6 Drawing Figures

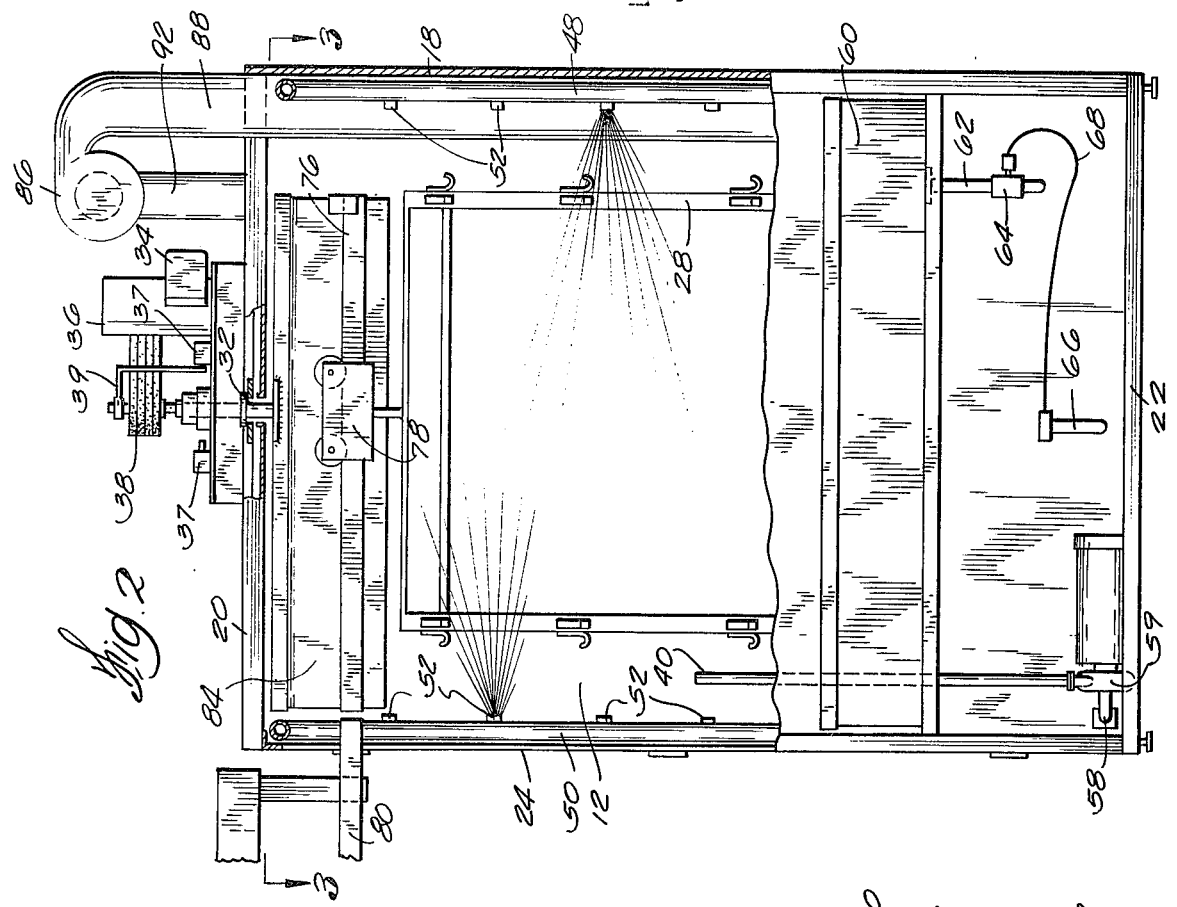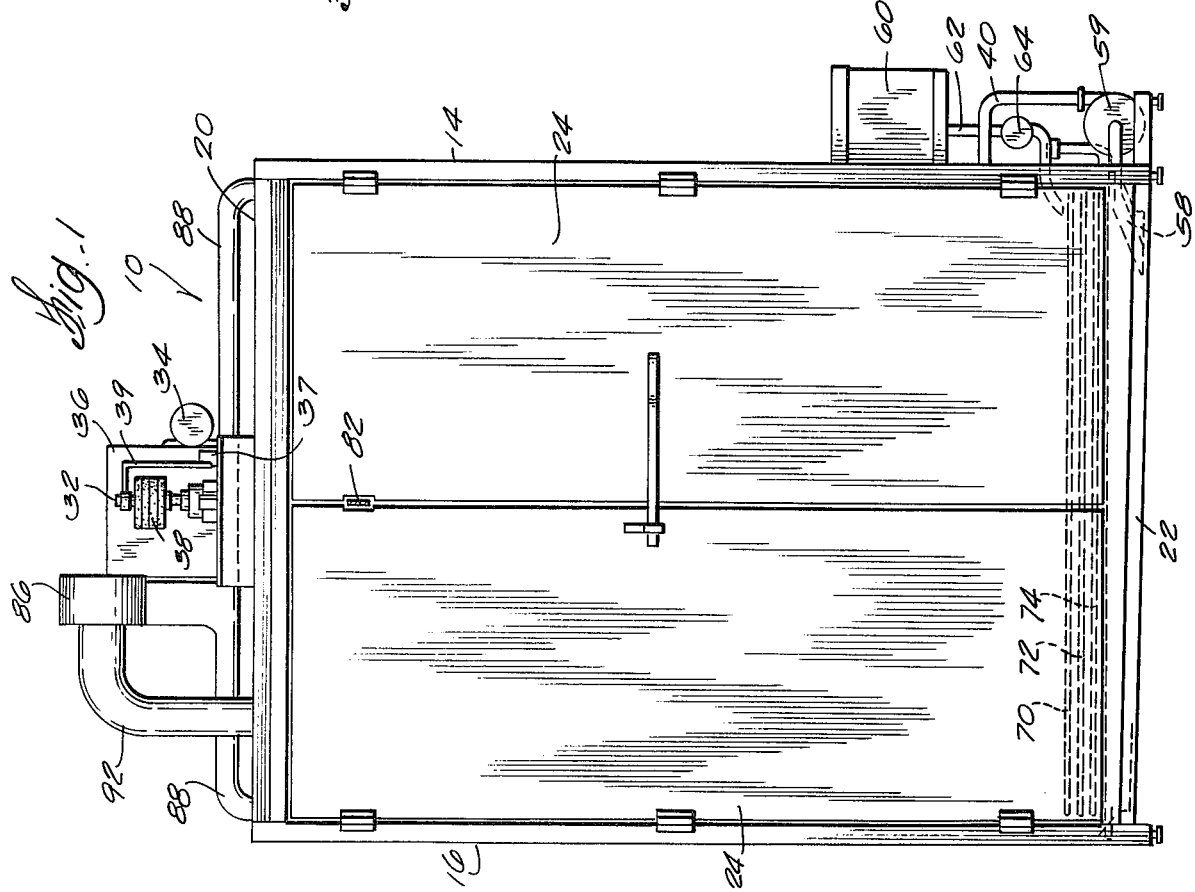

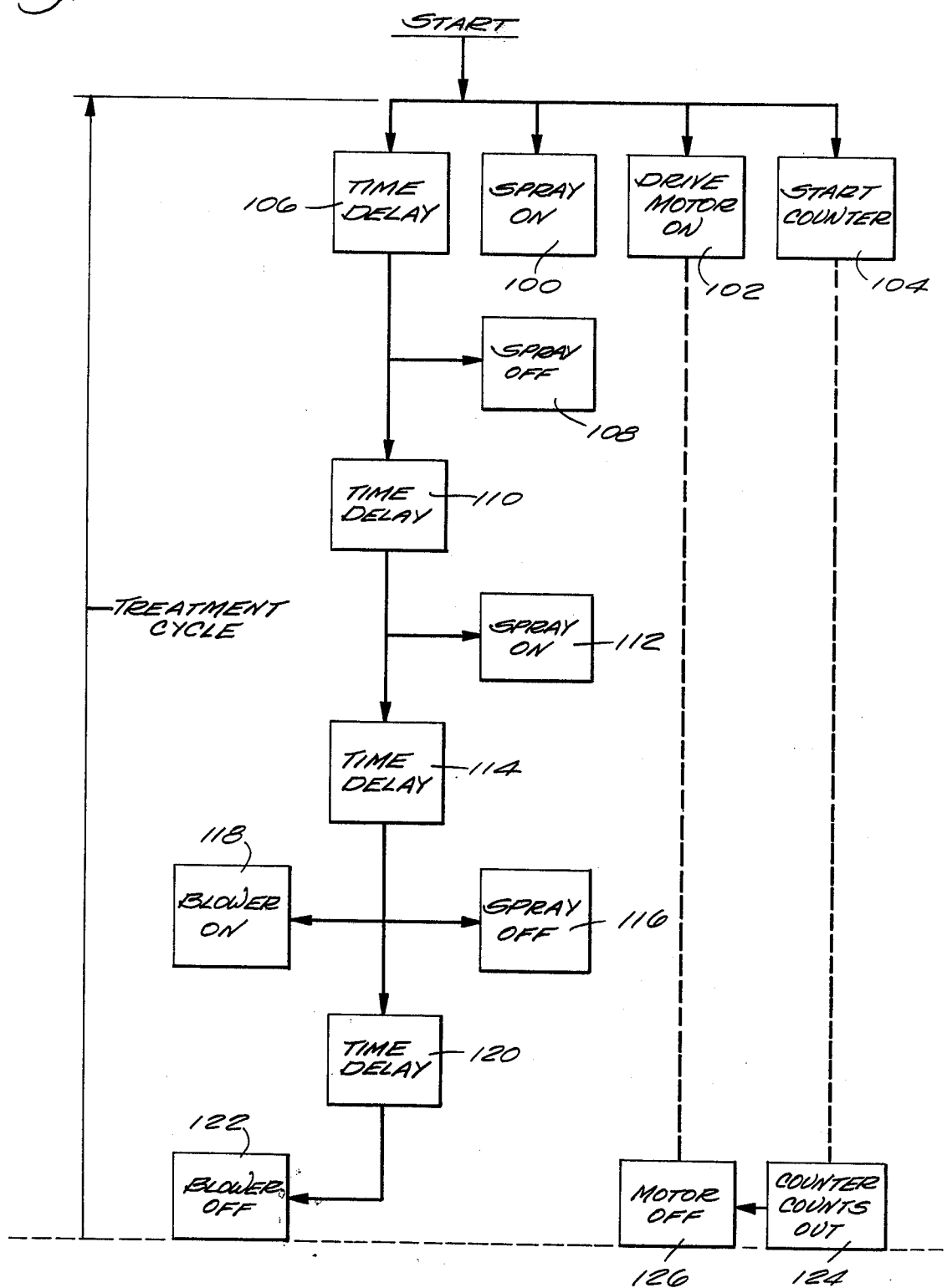

LIQUID SMOKE SPRAY CABINET

BACKGROUND OF THE INVENTION

This invention relates to devices for treating meat with liquid smoke.

Various meats such as bacon, ham, sausage, and the like, are commonly treated with a so-called "liquid smoke" which imparts a smoke flavor to the meat. In commercial operations where large quantities of meat are so treated, a rack or cage carrying relatively large quantities of the meat is placed in a cabinet or chamber wherein the liquid smoke is sprayed under pressure onto the meat. Uniform application of liquid smoke is desired in order to obtain a uniform flavor. After spraying, it is important that the excess liquid smoke adhering to the outer surface of the meat be removed in order to maximize recovery of unused liquid smoke for reuse and to prevent an undesired surface discoloration of the meat. The excess liquid smoke is usually removed by dripping and/or purging the meat with pressurized air or the like.

The prior art devices used for this purpose do not always provide a uniform exposure of the meat to the liquid smoke spray. Also, prior art devices require relatively long cycle times for the spraying and removal of the excess liquid smoke. Furthermore, the prior art devices are generally not adaptable for varying the spray, drip or purge steps to meet the varying treatment requirements for different types of meat.

SUMMARY OF THE INVENTION

The primary object of this invention is to provide a liquid smoke spray cabinet which is capable of achieving reduced cycle times for applying liquid smoke and effectively removing excess liquid smoke from the meat.

Another object of this invention is to provide a liquid smoke spray cabinet which is capable of uniformly applying the liquid smoke over substantially the entire surface of the meat being treated.

A further object of this invention is to provide a liquid smoke spray cabinet which is arranged so that changes in the spray, drip, and purge cycles can be easily varied to meet the treatment requirements for various types of meats and/or amount of smoking.

A still further object of this invention is to provide a liquid smoke spray cabinet which is capable of recovering and recycling unused liquid smoke without frequent replacement of filters.

Other objects, aspects and advantages of this invention will become apparent to those skilled in the art upon reviewing the following detailed description, the drawings and the appended claims.

The device of this invention includes a cabinet defining a treatment chamber, a carrier within the treatment chamber adapted to receive and support a rack on which the meat to be treated is suspended, a liquid smoke supply system including a pump for selectively supplying liquid smoke to a plurality of spray means which are located inside the treatment chamber and which direct a spray of liquid smoke onto the outer surface of the meat, and a blower for selectively applying a flow of air over the meat to purge excess liquid smoke from the meat after spraying. Means are provided for imparting an oscillating motion to the rack within the treatment chamber. Preferably, such means comprises a reversible drive means which is connected to the carrier and oscillates the carrier through a circular arc.

Means are provided for coordinating the sequential operation of the pump, the drive means, and the blower means so that liquid smoke can be sprayed onto the meat while the rack means is being oscillated, oscillation of the rack means can be carried on without a spray to permit excess liquid smoke to drip off the meat, and the blower means can be operated while the rack is being oscillated to remove additional liquid smoke which has not dripped off the meat. The oscillatory movement imparted to the meat sweeps it past the spray means to thereby maximize surface area coverage by the liquid smoke and, when the direction of motion is reversed, also imparts a swinging action to the meat, i.e., relative to the rack, to thereby enhance the removal of excess liquid smoke during the dripping and blower operation cycles.

Preferably, at least one of the spray means includes a plurality of vertically spaced spray nozzles which are arranged to provide a generally flat, fan-like spray pattern so as to create a sweeping effect over the major surface of the meat as it is oscillated through the spray. It is also preferred that at least one of the spray means includes a plurality of vertically spaced spray nozzles which are arranged to provide a generally hollow, conical spray pattern so as to improve coverage around the periphery of the meat, especially irregularly shaped portions of meat, as the meat is oscillated therethrough.

In one embodiment, the bottom portion of the cabinet is arranged to act as a basin for containing a supply of liquid smoke and for collecting excess liquid smoke and the inlet of the pump is located in communication with the basin. A reservoir containing a make-up supply of liquid smoke is connected in communication with the basin. The flow of liquid smoke from the reservoir to the basin is controlled by a liquid level controller means to automatically maintain a predetermined level of liquid smoke in the basin and thereby assure a sufficient level of liquid smoke in the basin to prevent pump cavitation.

Separate, vertically spaced screen filters of increasing mesh size from the top to bottom can be located in the treatment chamber above the basin to prevent dislodged meat particles from entering the basin and clogging the pump and/or the spray nozzles. The uses of the separate screens with increasing mesh size, rather than a single filter screen having a mesh size capable of removing the smaller meat particles, permits the device to be operated for a longer time period before the filters have to be removed for cleaning.

BRIEF DESCRIPTION OF THE DRAWINGS

FIG. 1, is a front elevational view of a liquid smoke spray cabinet embodying this invention.

FIG. 2, is a side elevational view, partially broken away, of the liquid smoke spray cabinet of FIG. 1.

FIG. 6, is a block diagram illustrating the electrical functions of an exemplary electrical circuit for auto matically controlling the operation of the liquid smoke spray cabinet.

DESCRIPTION OF THE PREFERRED EMBODIMENTS

Figure 3:
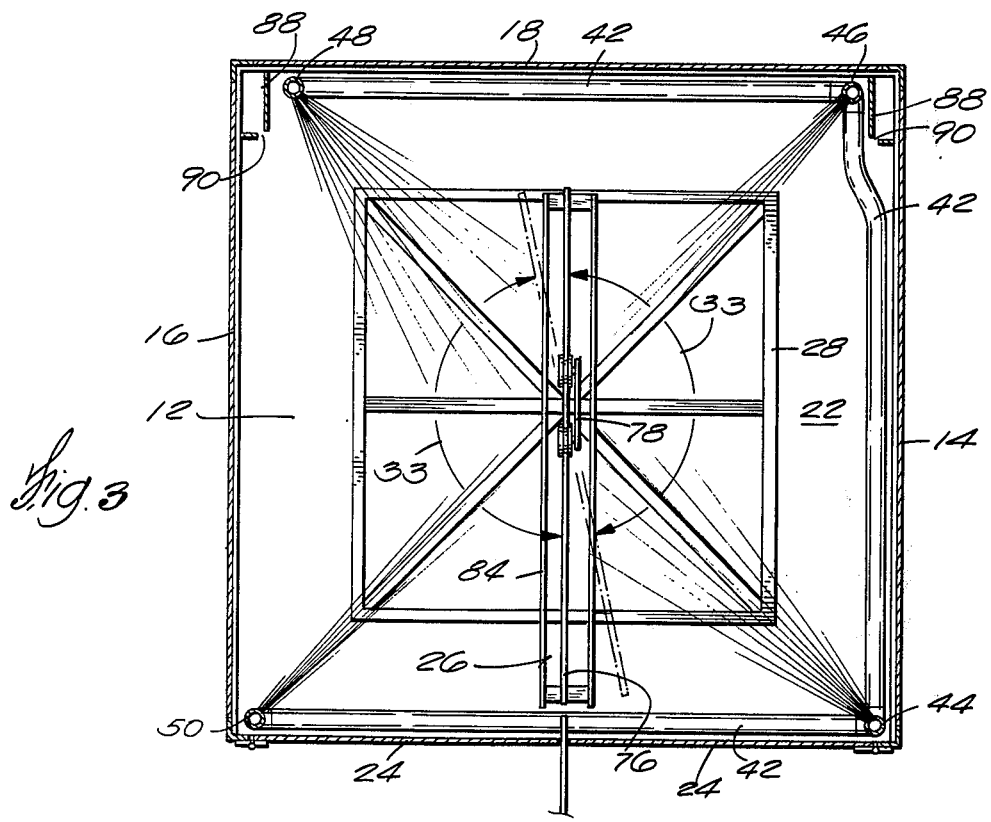
FIG. 3, is a cross-sectional view taken along the plane designated 3—3 in FIG. 2.

A liquid smoke spray cabinet 10 embodying this invention includes a treatment chamber 12 defined by opposed side walls 14 and 16, a back wall 18, a top wall 20, a bottom wall 22, and pair of hinged doors 24 generally forming a front wall, all of which are preferably constructed from a material which is resistant to attack by the liquid smoke, e.g., a stainless steel. A carrier 26 is provided in treatment chamber 12 for supporting a conventional packing plant handling rack 28 adapted to carry portions of meat, such as sausage links 30, which are to be treated with liquid smoke.

Means are provided for imparting an oscillating movement to rack 28, i.e., a movement whereby the direction of the motion of the rack is reversed. The oscillating movement of the rack imparts a jarring action to the meat which enhances the removal of excess liquid smoke from the meat as explained in more detail below. While various means can be used to provide the desired oscillating movement, in the preferred embodiment illustrated, a drive shaft 32, which extends through and is rotatably mounted on top wall 20, is connected to carrier 26 for imparting rotational movement to the carrier. Carrier 26 is oscillated through a circular arc (represented by arrows 33) by a reversible electrical motor 34 which is connected to carrier drive shaft 32 via a reductor 36 and a drive means, such as a pulley and drive belt assembly 38. While other drive means can be used, a pulley and drive belt assembly is preferred because the slippage between the belts and pulleys, when the rotational movement of carrier 26 is reversed, tends to minimize the effect of inertia and thereby minimize shocks in the drive system. In order to eliminate excessive drive slippage, both reductor 36 and assembly 38 can include several pulleys and belts, e.g., 6 or more.

The angle of the arc through which carrier 26 is oscillated is controlled by a pair of motion limit switches 37 which are mounted atop the exterior of top wall 20 and are angularly spaced apart with respect to drive shaft 32 at an angle corresponding to that desired for the arc of carrier oscillation. An arm 39 is connected to the upper portion of carrier drive shaft 32 and selectively actuates limit switches 37 as carrier 26 is rotated. Limit switches 37 are connected into an electrical circuitry which is arranged in a conventional manner so that, when each switch 37 is actuated by arm 39, motor 34 is reversed to thereby stop and reverse the direction of rotation of drive shaft 32 and, thus, carrier 26. The arc of carrier oscillation, which can be varied by changing the angular relationship between the drive shaft and limit switches 37, is preferably less than 180°. In the embodiment illustrated, the arc is about 170° which has been found to be quite adequate for obtaining uniform application of the liquid smoke as described below.

Located inside treatment chamber 12 for applying smoke onto the outer surface of the meat carried on rack 28 is a piping arrangment including a supply conduit 40, a header 42 connected to supply conduit 40 and extending horizontally near top wall 20, along the inside of side wall 14, back wall 18 and the front wall above the top edge of doors 24, and four feeder conduits, 44, 46, 48 and 50 which are connected to header 42 and are located at generally equally spaced positions around the perimeter of treatment chamber 12. These components are constructed from a material which is resistant to the attack by the liquid smoke, such as polyvinyl chloride. As shown in FIG. 3, feeder conduits 44, 46, 48, and 50 are preferably located in the vicinity of respective corners of cabinet 10. Liquid smoke, in the form of a fine spray, is applied to the outer surface of the meat through a plurality of vertically spaced spray nozzles 52 provided on each of the feeder conduits.

Feeder conduits 44, 46, 48, and 50 extend substantially the entire height of treatment chamber 12 and spray nozzles 52 are arranged in a manner so that a spray of liquid smoke is provided over the entire length of the meat being carried on rack 28. Spray nozzles 52 are arranged so that the spray patterns thereof are directed generally towards the center of treatment chamber 12. While all the spray nozzles can be constructed and arranged to provide the same spray pattern, in the preferred embodiment illustrated, spray nozzles 52 on alternate feeder conduits 46, and 50, in a conventional manner, provide a generally vertical, flat, fan-like spray pattern and spray nozzles 52 on alternate feeder conduits 44 and 48, in a conventional manner, provide a relatively wide angle, hollow conical spray pattern. The flat spray provided by the spray nozzles on feed conduits 46 and 50 produces a sweeping effect over the major surfaces of the meat as it is moved back and forth therethrough during oscillation of carrier 26 and the hollow, conical spray provided by the spray nozzles on feed conduits 44 and 48 produces wider angle pattern insuring better coverage over the periphery of the meat, especially for the irregularly shaped portions of meat.

At least a portion of bottom wall 22 of the cabinet 10 is arranged to act as a supply basin 54 for the liquid smoke 56 and also as a sump for collecting excess liquid smoke not absorbed by the meat. A heater panel 57 including integral heating means forms the bottom of supply basin 54 and heats the liquid smoke to a temperature desired for treatment, e.g., 180°F. In the construction illustrated, heater panel 57 includes a plurality of integral passages 59 through which steam or the like is flowed to provide the desired heating. The heated liquid smoke is pumped from supply basin 54, via an inlet conduit 58, by an electric motor driven pump 59 for spraying onto the meat as described above.

Means are provided for maintaining liquid smoke 56 in supply basin 54 at a predetermined liquid level sufficient to prevent cavitation of pump 59 and thereby insure adequate coverage of the meat. While various arrangements can be used, in the preferred embodiment illustrated, such means includes a reservoir 60 which is mounted on the outside of cabinet side wall 14 and contains a make-up supply of liquid smoke, a conduit 62 which is connected to the bottom of reservoir 60 and extends through side wall 14 towards supply basin 54, and a normally closed, solenoid-operated, control valve 64 which is opened to admit make-up liquid smoke by gravity feed into supply basin 54. Valve 64 is operably connected to a conventional liquid level controller 66 which includes a liquid level sensing means (not shown) for monitoring the level of liquid smoke 56 in supply basin 54. Liquid level controller 66 also includes means (not shown) which cooperates with the liquid level sensing means and, in response to the liquid smoke level in supply basin 54 falling below a predetermined level, transmits an opening signal to valve 64 via 68. When sufficient make-up liquid smoke has flowed from reservoir 60 into supply basin 54 to raise the liquid level therein to the predetermined level, as measured by the liquid level sensing means, the valve opening signal is terminated and valve 64 returns to the normally closed position. Thus, with this arrangement, the level of liquid smoke in supply basin 54 is automatically maintained at a level necessary to prevent pump cavitation and thereby insure the desired spray coverage of the meat.

Figure 4:
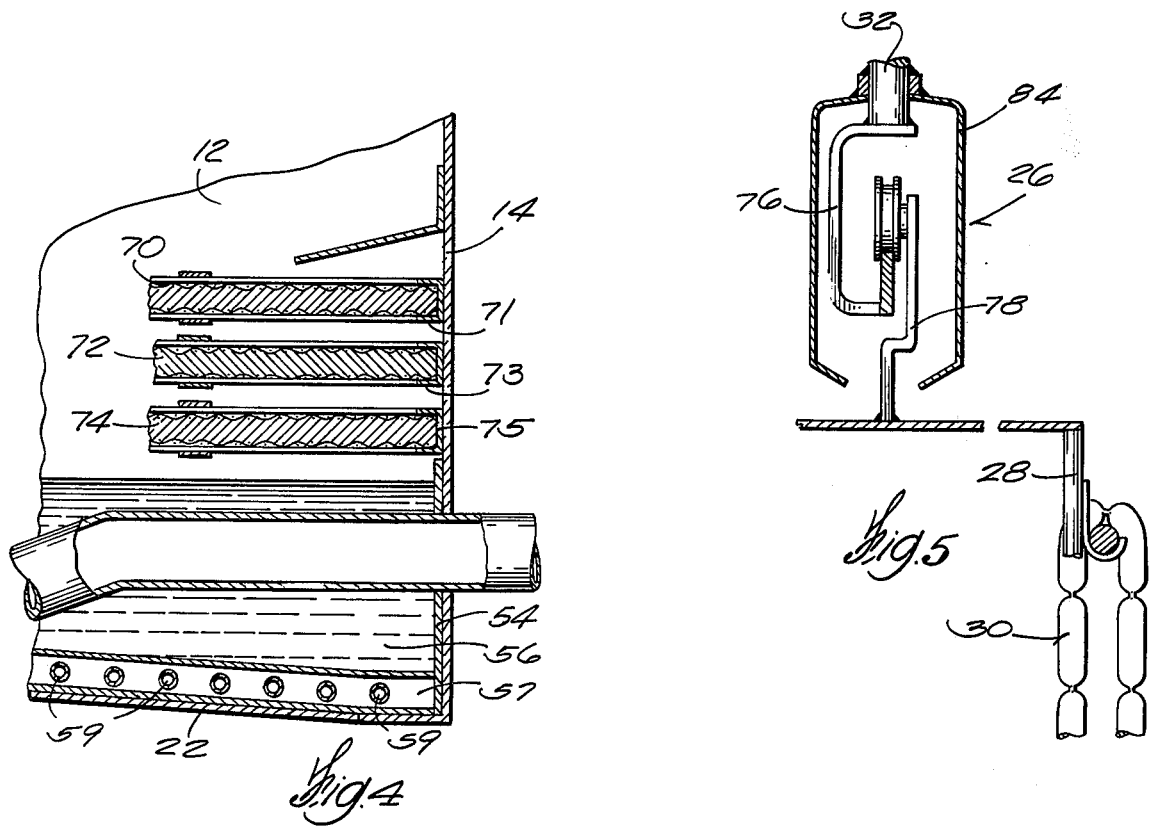
FIG. 4, is an enlarged, fragmentary view, partially broken away, showing the lower right hand portion of FIG. 1.
Figure 5:
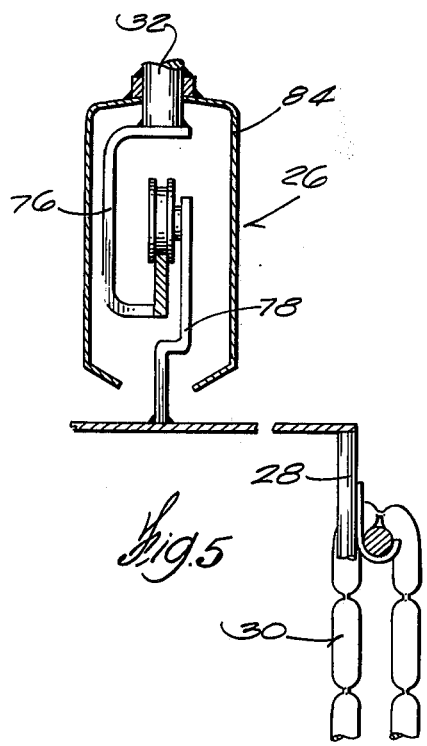
FIG. 5, is an enlarged, fragmentary view cross section view of the carrier.

Dislodged pieces of meat falling into supply basin 54 can plug pump 59 and/or spray nozzles 52. In order to eliminate this potential plugging problem, three vertically spaced screens 70, 72, and 74 are provided in treatment chamber 12 above supply basin 54. Screen 70, 72, and 74 are slidably mounted in respective opposed guides 71, 73, and 75 mounted on the inside of side walls 14 and 16 (only screen guides on side wall 14 are shown in FIG. 4). Screens 70, 72, and 74 are of increasing mesh size so that larger particles are retained on screen 70, intermediate sized particles are retained on screen 72 and small particles are retained on screen 74. For example, screen 70 can be 10 mesh with 0.025 inch diameter wire, screen 72 can be 20 mesh with 0.16 diameter wire, and screen 74 can be 40 mesh with 0.010 diameter wire. Thus, with this arrangement, effective filtering of different sized meat particles is provided without requiring frequent cleaning. A single screen having a mesh large enough to retain smaller meat particles also would retain larger particles and, consequently, cleaning at more frequent intervals would be required.

As best shown in FIGS. 2 and 3, carrier 26 includes a monorail 76 which is connected to drive shaft 32 and is adapted to receive the trolley 78 of meat rack 28. Carrier monorail 76 is alignable with the monorail 80 (shown fragmentarily) of a meat processing plant handling system. Cabinet doors 24 can be provided with openings 82 for receiving the end portion of handling system monorail 80. The outer end of handling system monorail 80 is positioned in closed proximity to the end of carrier monorail 76 so that, after opening cabinet doors 24, meat rack 28 can be easily transferred to and from treatment chamber 12 by simply moving meat rack trolley 78 from one monorail to another. If desired, the cabinet back wall 18 can also be provided with doors similar to front doors 24 and the handling system monorail arranged so that meat rack 28 can be moved out the back of the cabinet after the meat has been treated. Carrier 26 is provided with a hood or shield 84 which is arranged to prevent direct impingement of liquid smoke from nozzles 52 onto trolley 78 and carrier 26.

After the meat has been sprayed and excess liquid smoke has been allowed to drip off the meat, an electrical motor driven blower 86 mounted on the exterior of top wall 20 is operated to purge away any excess liquid smoke remaining on the outer surface of the meat. The outlet of blower 86 is connected to a pair of pressure ducts 88 which extend inside treatment chamber 12 as shown in FIG. 2. Each pressure duct 88 includes an elongated, vertical slot 90 which extends substantially the entire height of the meat rack 28 and through which pressurized air is blown by the blower towards rack 28. The intake of blower 86 is connected in communication with treatment chamber 12 by an inlet duct 92. Thus, a closed system is provided with the purging air being recirculated over the meat, thereby minimizing the possibility of external contamination.

The pump motor, the blower motor and the carrier drive motor are electrically interconnected in an electrical circuitry which is arranged in a manner so that these motors can be selectively energized to provide the desired spray, drip and purge cycle. Since the electrical circuitry itself is not an essential part of the invention and can be arranged in many different conventional manners, a detailed description of same has been omitted for the purposes of brevity. FIG. 6 is a block diagram of the various electrical functions provided by an exemplary electrical circuitry for operating the liquid spray cabinet of this invention. Reference is made to FIG. 6 for describing a treatment cycle of the cabinet.

Rack 28 carrying the meat to be treated, is first moved into treatment chamber 12 and doors 24 are closed. The treatment cycle is initiated by actuating a start switch (not shown). The pump motor is energized (represented by block 100) to initiate spraying of the meat with liquid smoke and the carrier drive motor is energized (represented by block 102) to initiate oscillating of the carrier (and thus the meat rack) as described above. An electrical counter 104, which is operably connected in the electrical circuit to count each oscillatory cycle of the carrier, is also energized when the start switch is actuated. Also, an adjustable time delay device 106, which is adjusted to provide the time interval desired for the initial spray, is energized by the start signal.

When time delay 106 times out, the pump motor is de-energized (represented by block 108) to terminate the initial spray and a second adjustable time delay device 110, which is adjusted for the time interval desired for dripping, is initiated. During this time interval, the carrier drive motor continues to oscillate the carrier and excess liquid smoke is allowed to drip off the meat. When the rotational direction of the carrier is reversed during oscillation, the jarring effect thus imparted to the meat substantially expedites the dripping action.

When time delay 110 times out, the pump motor is re-energized (represented by block 112) to commence a second spray, while the carrier drive motor continues to oscillate the carrier, and a third adjustable time delay device 114, which is adjusted for the time interval desired for the second spray, is initiated. It has been found that two short spray periods provide better liquid smoke coverage than a single spray period of the same total time.

When time delay 114 times out, the pump motor is de-energized (represented by block 116) to terminate the second spray, the blower motor is energized (represented by block 118) to purge the meat with pressurized air as described above, and a time delay device 120, which is adjusted for the time interval desired for purging, is initiated. During this time, the carrier motor continues to oscillate the carrier and the meat is moved back and forth through the generally vertical, pressurized air streams flowing from pressure ducts 88.

When time delay 120 times out, the blower motor is de-energized (represented by block 122) to terminate the purging period. When the preselected number of carrier cycles have been completed (represented by block 124), the carrier drive motor is de-energized (represented by block 126) and the treatment cycle is completed. The treated meat can then be removed from the cabinet or the cycle repeated as desired.

The time delay devices can be conventional timers which are adjustable, for example from 0 to 60 seconds, so that the durations of the spray, drip and purging periods can be varied to meet the treatment requirements for the particular type of meat being treated. For instance, a ¼ H.P. carrier drive motor can rotate a meat rack carrying up to 1,200 lbs. of meat through a 170° arc in about 10 seconds or about 20 seconds through a complete oscillatory cycle. With the time delay devices being adjustable from 0 to 60 seconds, each of the spray, drip and purge periods can be adjusted for time intervals up to 3 full oscillatory cycles. If desired, the electrical control system can be arranged so the various steps of the treatment cycle can be controlled manually.

From the above description, it can be appreciated that the liquid smoke spray cabinet of this invention, although simply arranged, is capable of uniformly treating meat with liquid smoke within a reduced time period. Also, the spray, drip and purge periods can be easily adjusted to meet the requirements of the meat being treated.

We claim:

1. A device for treating meat with liquid smoke comprising, in combination:
   a cabinet defining a treatment chamber;
   a carrier located inside said treatment chamber and adapted to receive and support a rack carrying the meat to be treated;
   a plurality of spray means inside said treatment chamber for directing a spray of liquid smoke onto the outer surface of the meat being treated;
   a liquid smoke supply system including a pump means for selectively supplying liquid smoke to said spray means;
   drive means for imparting an oscillating movement to said carrier and thereby impart a jarring action on the meat so as to enhance removal of excess liquid smoke therefrom; and
   blower means for selectively applying a flow of pressurized air over the outer surface of the meat being treated.

2. A device according to claim 1 including means for sequentially and coordinately operating said pump means, said drive means, and said blower means so that said drive means oscillates said carrier without said blower means operating and with said pump means operating to spray liquid smoke onto the meat, said drive means oscillates said carrier with neither said pump means nor said blower means operating to allow excess liquid smoke to drip off the meat, and said drive means oscillates said carrier without said pump means operating and with said blower means operating to apply a flow of pressurized air over the surface of the meat.

3. A device according to claim 1 wherein said carrier is mounted for rotation about a vertical axis and said drive means is operably connected to said carrier and oscillates said carrier through a circular arc about the axis.

4. A device according to claim 3 wherein said arc is less than 180°.

5. A device according to claim 1 wherein said liquid smoke supply system includes at least four vertical feeder conduits which are laterally spaced around the inside periphery of said treatment chamber; and
   said spray means includes a plurality of vertically spaced spray nozzles carried by each of said feeder conduits, said spray nozzles carried by first of said feeder conduits being arranged to provide a generally vertical, fan-like spray pattern of liquid smoke directed generally towards the center of said treatment chamber and said spray nozzles carried by second of said feeder conduits being arranged to provide a generally hollow, conical spray pattern of liquid smoke directed generally towards the center of said treatment chamber.

6. A device according to claim 1 including,
   means defining a basin in the bottom portion of said cabinet for containing a supply of liquid smoke and for collecting liquid smoke dripping from the meat being treated;
   means connecting said pump means in communication with said basin; and
   a plurality of vertically spaced filtering screens located above said basin for removing meat particles from the liquid smoke flowing from said treatment chamber into said basin, said screens being of increasing mesh from top to bottom so that the minimum sized meat particles retained on each subjacent screen is smaller.

7. A device according to claim 1 including,
   means defining a basin in the bottom portion of said cabinet for containing a supply of liquid smoke and for collecting liquid smoke dripping from the meat being treated;
   means connecting said pump means in communication with said basin;
   means defining a reservoir mounted on said cabinet for containing a make-up supply or liquid smoke;
   conduit means for transferring make-up liquid smoke from said reservoir into said basin;
   valve means for controlling flow of make-up liquid smoke through said transfer conduit means;
   means for monitoring the liquid level of liquid smoke in said basin and for transmitting an opening signal to said valve means for transmitting an opening signal to said valve means in response to said liquid level falling below a predetermined level so that make-up liquid smoke is transferred from said reservoir into said basin to maintain the liquid smoke in said basin at said predetermined level.

8. A device for treating meat with liquid smoke comprising, in combination,
   a cabinet defining a treatment chamber;
   a carrier located inside said treatment chamber and adapted to receive and support a rack means carrying the meat to be treated;
   a liquid smoke supply system including at least four vertical feeder conduits which are laterally spaced around the inside periphery of said treatment chamber and a pump means for selectively supplying liquid smoke to said feeder conduits;
   a plurality of vertically spaced spray nozzles carried by each of said feeder conduits for directing a spray of liquid smoke onto the outer surface of the meat being treated;
   drive means for imparting an oscillating movement to said carrier and thereby impart a jarring action on the meat so as to enhance removal of excess liquid smoke therefrom;

blower means for selectively applying a flow of pressurized air over the outer surface of the meat being treated;

means defining a basin in the bottom portion of said cabinet for containing a supply of liquid smoke and for collecting liquid smoke dripping from the meat being treated;

means connecting said pump means in communication with said basin;

means defining a reservoir mounted on said cabinet for containing a make-up supply of liquid smoke;

conduit means for transferring make-up liquid smoke from said reservoir into said basin;

valve means for controlling flow of make-up liquid smoke through said transfer conduit means;

means for monitoring the liquid level of liquid smoke in said basin and for transmitting an opening signal to said valve means in response to said level falling below a predetermined level so that make-up liquid smoke is transferred from said reservoir into said basin to maintain the liquid smoke in said basin at said predetermined level.

9. A device according to claim 8 including,
a plurality of vertically spaced filtering screens located above said basin for removing meat particles from the liquid smoke flowing from said treatment chamber into said basin, said screens being of increasing mesh from top to bottom so that the minimum sized meat particles retained on each subjacent screen is smaller.

10. A device according to claim 9 wherein said carrier is mounted for rotation about a vertical axis said drive means is operably connected to said carrier and oscillates said carrier through a circular arc about the axis.

11. A device according to claim 9 including,
means for sequentially and coordinately operating said pump means, said drive means, and said blower means so that said drive means oscillates said carrier without said blower means operating and with said pump means operating to spray liquid smoke onto the meat, said drive means oscillates said carrier with neither said pump means nor said blower means operating to allow excess liquid smoke to drip off the meat, and said drive means oscillates said carrier without said pump means operating and with said blower means operating to apply a flow of pressurized gas over the surface of the meat.

12. A device for treating meat with liquid smoke comprising, in combination;
a cabinet defining a treatment chamber;
a carrier located inside said treatment chamber and adapted to receive and support a rack means carrying the meat to be treated;
a plurality of spray means inside said treatment chamber for directing a spray of liquid smoke onto the outer surface of the meat being treated;
a liquid smoke supply system including a pump means for selectively supplying liquid smoke to said spray means;
drive means for imparting an oscillating movement to said carrier and thereby impart a jarring action on the meat so as to enhance removal of excess liquid therefrom;
blower means for selectively applying a flow of pressurized air over the outer surface of the meat being treated;
means defining a basin in the bottom portion of said cabinet for containing a supply of liquid smoke and for collecting liquid smoke dripping from the meat being treated;
means connecting said pump means in communication with said basin;
means defining a reservoir mounted on said cabinet for containing a make-up supply of liquid smoke;
conduit means for transferring make-up liquid smoke from said reservoir into said basin;
valve means for controlling flow of make-up liquid smoke through said transfer conduit means;
means for monitoring the liquid level of liquid smoke in said basin and for transmitting an opening signal to said valve means in response to said liquid level falling below a predetermined level so that make-up liquid smoke is transferred from said reservoir into said basin to maintain the liquid smoke in said basin at said predetermined level.

13. A device according to claim 12 wherein said carrier is mounted for rotational movement about a vertical axis and said drive means is operably connected to said carrier and oscillates said carrier through a circular arc of less than 180° about the axis.

* * * * *